(12) United States Patent
Yakes et al.

(10) Patent No.: US 12,036,868 B2
(45) Date of Patent: *Jul. 16, 2024

(54) REFUSE VEHICLE WITH INDEPENDENTLY OPERATIONAL ACCESSORY SYSTEM

(71) Applicant: Oshkosh Corporation, Oshkosh, WI (US)

(72) Inventors: Christopher K. Yakes, Oshkosh, WI (US); Nader Nasr, Neenah, WI (US); Robert S. Messina, Oshkosh, WI (US); Joshua D. Rocholl, Rochester, MN (US); Derek A. Wente, Austin, MN (US); Vincent Hoover, Byron, MN (US); Zachary L. Klein, Rochester, MN (US); Clinton T. Weckwerth, Pine Island, MN (US); Skylar A. Wachter, Dodge Center, MN (US); Jeff Koga, Oshkosh, WI (US); Emily Davis, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,701

(22) Filed: Apr. 6, 2023

(65) Prior Publication Data

US 2023/0241960 A1 Aug. 3, 2023

Related U.S. Application Data

(63) Continuation of application No. 17/221,255, filed on Apr. 2, 2021, now Pat. No. 11,648,834, which is a
(Continued)

(51) Int. Cl.
*B60K 6/46* (2007.10)
*B60L 1/00* (2006.01)
(Continued)

(52) U.S. Cl.
CPC ............... *B60K 6/46* (2013.01); *B60L 1/003* (2013.01); *B65F 3/041* (2013.01); *B65F 2003/025* (2013.01)

(58) Field of Classification Search
CPC ....... B60K 6/46; B60L 1/003; B60L 2200/36; B60L 50/64; B60L 50/61; Y02T 10/70; Y02T 10/62; Y02W 30/10
See application file for complete search history.

(56) References Cited

U.S. PATENT DOCUMENTS 3,662,911 A 5/1972 Harman
3,666,126 A 5/1972 Rempel
(Continued)

*Primary Examiner* — Mussa A Shaawat
(74) *Attorney, Agent, or Firm* — Foley & Lardner LLP

(57) ABSTRACT

A refuse vehicle includes multiple tractive elements, a prime mover, and an independent accessory system. The prime mover is configured to generate mechanical energy to drive one or more of the tractive elements. The independent accessory system includes one or more storage tanks configured to store a fuel, and an accessory primary mover. The accessory primary mover is configured to fluidly couple with the one or more storage tanks to receive the fuel from the one or more storage tanks and operate to pressurize a hydraulic fluid to drive an accessory of the refuse vehicle. The accessory primary mover is configured to pressurize the hydraulic fluid to drive the accessory of the refuse vehicle independently of operation of the prime mover.

20 Claims, 6 Drawing Sheets

Related U.S. Application Data continuation of application No. 17/007,605, filed on Aug. 31, 2020, now Pat. No. 11,001,135, which is a continuation of application No. 16/943,295, filed on Jul. 30, 2020, now Pat. No. 11,007,863.

(60) Provisional application No. 62/881,089, filed on Jul. 31, 2019.

(51) Int. Cl.
   B65F 3/04 (2006.01)
   B65F 3/02 (2006.01)

(56) References Cited

U.S. PATENT DOCUMENTS

| | | |
|---|---|---|
| 3,771,674 A | 11/1973 | Clucker |
| 3,804,277 A | 4/1974 | Brown et al. |
| 4,016,988 A | 4/1977 | Dahlin |
| 4,096,959 A * | 6/1978 | Schaffler ............. B65F 3/205 |
| | | 414/525.5 |
| 4,175,903 A | 11/1979 | Carson |
| 4,200,330 A | 4/1980 | Scott |
| 4,225,182 A | 9/1980 | Werner |
| 4,229,135 A | 10/1980 | Malmros |
| 4,252,495 A | 2/1981 | Cook |
| 4,286,911 A | 9/1981 | Benjamin |
| 4,441,848 A | 4/1984 | Bailey |
| 4,618,306 A | 10/1986 | Dorsch |
| 4,704,062 A | 11/1987 | Hale |
| 4,771,837 A | 9/1988 | Appleton et al. |
| 5,171,121 A | 12/1992 | Smith et al. |
| 5,378,010 A | 1/1995 | Marino et al. |
| 5,607,277 A | 3/1997 | Zopf |
| 5,639,201 A | 6/1997 | Curotto |
| 5,731,705 A | 3/1998 | Guinn |
| 5,833,428 A | 11/1998 | Szinte |
| 5,919,026 A | 7/1999 | Appleton |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | McNeilus et al. |
| 5,984,609 A | 11/1999 | Bartlett |
| 6,033,176 A | 3/2000 | Bartlett |
| 6,062,803 A | 5/2000 | Christenson |
| 6,071,057 A | 6/2000 | Duron et al. |
| 6,089,813 A | 7/2000 | McNeilus et al. |
| 6,105,984 A | 8/2000 | Schmitz et al. |
| 6,120,235 A | 9/2000 | Humphries et al. |
| 6,123,500 A | 9/2000 | McNeilus et al. |
| 6,135,536 A | 10/2000 | Ciavaglia et al. |
| 6,210,094 B1 | 4/2001 | McNeilus et al. |
| 6,213,706 B1 | 4/2001 | Christenson |
| 6,224,317 B1 | 5/2001 | Kann et al. |
| 6,224,318 B1 | 5/2001 | McNeilus et al. |
| 6,247,713 B1 | 6/2001 | Konop |
| 6,266,598 B1 | 7/2001 | Pillar et al. |
| 6,315,515 B1 | 11/2001 | Young et al. |
| 6,336,783 B1 | 1/2002 | Young et al. |
| 6,350,098 B1 | 2/2002 | Christenson et al. |
| 6,421,593 B1 | 7/2002 | Kempen et al. |
| 6,447,239 B2 | 9/2002 | Young et al. |
| 6,474,928 B1 | 11/2002 | Christenson |
| 6,497,547 B1 | 12/2002 | Maglaras |
| 6,516,914 B1 | 2/2003 | Andersen et al. |
| 6,553,290 B1 | 4/2003 | Pillar |
| 6,565,305 B2 | 5/2003 | Schrafel |
| 6,652,213 B1 | 11/2003 | Mitchell et al. |
| 6,843,148 B2 | 1/2005 | Marcel |
| 7,018,155 B1 | 3/2006 | Heberling et al. |
| 7,070,382 B2 | 7/2006 | Pruteanu et al. |
| 7,261,354 B1 | 8/2007 | Lozano |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,597,172 B1 * | 10/2009 | Kovach ............. F16H 47/02 |
| | | 180/305 |
| 7,654,354 B1 | 2/2010 | Otterstrom |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,607 B2 | 1/2013 | Bretschneider et al. |
| 8,360,706 B2 | 1/2013 | Addleman et al. |
| 8,398,176 B2 | 3/2013 | Haroldsen et al. |
| 8,540,475 B2 | 9/2013 | Kuriakose et al. |
| 8,550,764 B2 | 10/2013 | Rowland et al. |
| 8,554,643 B2 | 10/2013 | Kortelainen |
| 8,807,613 B2 | 8/2014 | Howell et al. |
| 8,857,567 B1 | 10/2014 | Raymond |
| 9,045,014 B1 | 6/2015 | Verhoff et al. |
| 9,067,730 B2 | 6/2015 | Curotto |
| 9,114,804 B1 | 8/2015 | Shukla et al. |
| 9,132,736 B1 | 9/2015 | Shukla et al. |
| 9,174,686 B1 | 11/2015 | Messina et al. |
| 9,216,856 B2 | 12/2015 | Howell et al. |
| 9,290,093 B2 | 3/2016 | Turner et al. |
| 9,296,558 B2 | 3/2016 | Parker |
| 9,376,102 B1 | 6/2016 | Shukla et al. |
| 9,387,985 B2 | 7/2016 | Gillmore et al. |
| 9,511,932 B2 | 12/2016 | Curotto et al. |
| 9,656,640 B1 | 5/2017 | Verhoff et al. |
| 9,707,869 B1 | 7/2017 | Messina et al. |
| 9,880,581 B2 | 1/2018 | Kuriakose et al. |
| 9,902,559 B2 | 2/2018 | Parker |
| 9,919,702 B1 | 3/2018 | Wang et al. |
| 9,926,134 B2 | 3/2018 | Ford |
| 9,981,803 B2 | 5/2018 | Davis et al. |
| 10,144,585 B2 | 5/2018 | Curotto |
| 10,035,648 B2 | 7/2018 | Haddick et al. |
| 10,144,584 B2 * | 12/2018 | Parker ............. B65F 3/041 |
| 10,196,205 B2 | 2/2019 | Betz et al. |
| D843,281 S | 3/2019 | Gander et al. |
| 10,351,340 B2 | 7/2019 | Haddick et al. |
| 10,407,242 B2 | 9/2019 | Rimsa |
| 10,414,067 B2 | 9/2019 | Datema et al. |
| 10,414,266 B1 | 9/2019 | Wiegand et al. |
| 10,456,610 B1 | 10/2019 | Betz et al. |
| 10,457,533 B2 | 10/2019 | Puszkiewicz et al. |
| D869,332 S | 12/2019 | Gander et al. |
| D871,283 S | 12/2019 | Gander et al. |
| 10,513,392 B2 | 12/2019 | Haddick et al. |
| 10,556,622 B1 | 2/2020 | Calliari et al. |
| 10,558,234 B2 | 2/2020 | Kuriakose et al. |
| 10,611,204 B1 | 4/2020 | Zhang et al. |
| 10,647,025 B2 | 5/2020 | Fox et al. |
| D888,629 S | 6/2020 | Gander et al. |
| 11,097,617 B2 | 8/2021 | Rocholl et al. |
| 2002/0014754 A1 | 2/2002 | Konop |
| 2002/0065594 A1 | 5/2002 | Squires et al. |
| 2002/0103580 A1 | 8/2002 | Yakes et al. |
| 2002/0112851 A1 | 8/2002 | O'Donnell |
| 2003/0091417 A1 | 5/2003 | Swann |
| 2003/0130765 A1 | 7/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0171854 A1 | 9/2003 | Pillar et al. |
| 2003/0200015 A1 | 10/2003 | Pillar |
| 2003/0205422 A1 | 11/2003 | Morrow et al. |
| 2004/0004346 A1 | 1/2004 | Humphries |
| 2004/0019414 A1 | 1/2004 | Pillar et al. |
| 2004/0024502 A1 | 2/2004 | Squires et al. |
| 2004/0039510 A1 | 2/2004 | Archer et al. |
| 2004/0069865 A1 | 4/2004 | Rowe et al. |
| 2004/0133332 A1 | 7/2004 | Yakes et al. |
| 2005/0080520 A1 | 4/2005 | Kline et al. |
| 2005/0109549 A1 | 5/2005 | Morrow |
| 2005/0113988 A1 | 5/2005 | Nasr et al. |
| 2005/0114007 A1 | 5/2005 | Pillar et al. |

(56) References Cited

U.S. PATENT DOCUMENTS

| | | |
|---|---|---|
| 2005/0119806 A1 | 6/2005 | Nasr et al. |
| 2005/0209747 A1 | 9/2005 | Yakes et al. |
| 2005/0234622 A1 | 10/2005 | Pillar et al. |
| 2005/0285365 A1 | 12/2005 | Manser et al. |
| 2006/0065451 A1 | 3/2006 | Morrow et al. |
| 2006/0065453 A1 | 3/2006 | Morrow et al. |
| 2006/0066109 A1 | 3/2006 | Nasr |
| 2006/0070776 A1 | 4/2006 | Morrow et al. |
| 2006/0070788 A1 | 4/2006 | Schimke |
| 2006/0071466 A1 | 4/2006 | Rowe et al. |
| 2006/0071645 A1 | 4/2006 | Bolton |
| 2006/0106521 A1 | 5/2006 | Nasr et al. |
| 2006/0280582 A1 | 12/2006 | Kouri |
| 2007/0061054 A1 | 3/2007 | Rowe et al. |
| 2007/0088469 A1 | 4/2007 | Schmiedel et al. |
| 2007/0173987 A1 | 7/2007 | Rowe et al. |
| 2007/0185625 A1 | 8/2007 | Pillar et al. |
| 2007/0288131 A1 | 12/2007 | Yakes et al. |
| 2007/0291130 A1 | 12/2007 | Broggi et al. |
| 2007/0292249 A1 | 12/2007 | Wilson |
| 2008/0004777 A1 | 1/2008 | Quigley |
| 2008/0012280 A1 | 1/2008 | Humphries |
| 2008/0059014 A1 | 3/2008 | Nasr et al. |
| 2008/0065285 A1 | 3/2008 | Yakes et al. |
| 2008/0071438 A1 | 3/2008 | Nasr et al. |
| 2008/0114513 A1 | 5/2008 | Pillar et al. |
| 2008/0150350 A1 | 6/2008 | Morrow et al. |
| 2008/0215190 A1 | 9/2008 | Pillar et al. |
| 2008/0221754 A1 | 9/2008 | Rowe et al. |
| 2009/0015716 A1 | 1/2009 | Doedens |
| 2009/0018716 A1 | 1/2009 | Ambrosio |
| 2009/0079839 A1 | 3/2009 | Fischer et al. |
| 2009/0127010 A1 | 5/2009 | Morrow et al. |
| 2009/0194347 A1 | 8/2009 | Morrow et al. |
| 2009/0205885 A1 | 8/2009 | Strong |
| 2010/0116569 A1 | 5/2010 | Morrow et al. |
| 2010/0183410 A1 | 7/2010 | Curotto |
| 2010/0281654 A1 | 11/2010 | Curotto |
| 2010/0301668 A1 | 12/2010 | Yakes et al. |
| 2011/0312459 A1 | 12/2011 | Morrow et al. |
| 2012/0143430 A1 | 6/2012 | Broggi et al. |
| 2013/0196806 A1 | 8/2013 | Morrow et al. |
| 2014/0020415 A1 | 1/2014 | Heyl |
| 2014/0257621 A1 | 9/2014 | Zych |
| 2014/0291045 A1 | 10/2014 | Collett et al. |
| 2015/0093220 A1 | 4/2015 | Parker |
| 2015/0159564 A1 | 6/2015 | Wildgrube et al. |
| 2015/0165871 A1 | 6/2015 | Miller et al. |
| 2015/0283894 A1 | 10/2015 | Morrow et al. |
| 2015/0321546 A1 | 11/2015 | Oue et al. |
| 2016/0001765 A1 | 1/2016 | Shukla et al. |
| 2016/0023548 A1* | 1/2016 | Crist ................. B65F 3/00 180/271 |
| 2016/0059690 A1 | 3/2016 | Wildgrube |
| 2016/0152188 A1 | 6/2016 | Handschke et al. |
| 2016/0297417 A1 | 10/2016 | Shukla et al. |
| 2016/0304041 A1 | 10/2016 | Lennevi et al. |
| 2016/0361987 A1 | 12/2016 | Morrow et al. |
| 2017/0008507 A1 | 1/2017 | Shukla et al. |
| 2017/0036628 A1 | 2/2017 | Nelson et al. |
| 2017/0121108 A1 | 5/2017 | Davis et al. |
| 2017/0158050 A1 | 6/2017 | Crist et al. |
| 2017/0247186 A1 | 8/2017 | Whitfield et al. |
| 2017/0253221 A1 | 9/2017 | Verhoff et al. |
| 2017/0341860 A1 | 11/2017 | Dodds et al. |
| 2017/0349373 A1 | 12/2017 | Gentry et al. |
| 2017/0349374 A1 | 12/2017 | Haddick et al. |
| 2017/0361491 A1 | 12/2017 | Datema et al. |
| 2017/0361492 A1 | 12/2017 | Datema et al. |
| 2018/0072303 A1 | 3/2018 | Shukla et al. |
| 2018/0215354 A1 | 8/2018 | Linsmeier et al. |
| 2018/0250847 A1 | 9/2018 | Wurtz et al. |
| 2018/0327183 A1 | 11/2018 | Peek et al. |
| 2018/0334324 A1 | 11/2018 | Haddick et al. |
| 2018/0345783 A1 | 12/2018 | Morrow et al. |
| 2019/0039407 A1 | 2/2019 | Smith |
| 2019/0047413 A1 | 2/2019 | Crist et al. |
| 2019/0091890 A1 | 3/2019 | Rocholl et al. |
| 2019/0118721 A1 | 4/2019 | Handschke et al. |
| 2019/0121353 A1 | 4/2019 | Datema et al. |
| 2019/0137324 A1* | 5/2019 | Curotto ................. B65F 1/1484 |
| 2019/0185077 A1 | 6/2019 | Smith et al. |
| 2019/0193934 A1 | 6/2019 | Rocholl et al. |
| 2019/0270587 A1 | 9/2019 | Haddick et al. |
| 2019/0291711 A1 | 9/2019 | Shukla et al. |
| 2019/0292975 A1 | 9/2019 | Hou et al. |
| 2019/0299791 A1* | 10/2019 | Gonze ................. H01M 10/66 |
| 2019/0322321 A1 | 10/2019 | Schwartz et al. |
| 2019/0325220 A1 | 10/2019 | Wildgrube et al. |
| 2019/0344475 A1 | 11/2019 | Datema et al. |
| 2019/0351758 A1 | 11/2019 | Wiegand et al. |
| 2019/0351883 A1 | 11/2019 | Verhoff et al. |
| 2019/0359184 A1 | 11/2019 | Linsmeier et al. |
| 2019/0360600 A1 | 11/2019 | Jax et al. |
| 2019/0381990 A1 | 12/2019 | Shukla et al. |
| 2020/0031641 A1 | 1/2020 | Puszkiewicz et al. |
| 2020/0038700 A1 | 2/2020 | Betz et al. |
| 2020/0039341 A1 | 2/2020 | Morrow et al. |
| 2020/0047586 A1* | 2/2020 | Gonze ................. B60H 1/3227 |
| 2020/0078986 A1 | 3/2020 | Clifton et al. |
| 2020/0087063 A1 | 3/2020 | Haddick et al. |
| 2020/0102145 A1 | 4/2020 | Nelson et al. |
| 2020/0130746 A1 | 4/2020 | Calliari et al. |
| 2020/0230841 A1 | 7/2020 | Datema et al. |
| 2020/0230842 A1 | 7/2020 | Datema et al. |
| 2020/0231035 A1 | 7/2020 | Crist et al. |
| 2020/0262366 A1 | 8/2020 | Wildgrube et al. |
| 2020/0265656 A1 | 8/2020 | Koga et al. |
| 2021/0253347 A1* | 8/2021 | Pung ................. B65F 3/10 |

* cited by examiner

REFUSE VEHICLE WITH INDEPENDENTLY OPERATIONAL ACCESSORY SYSTEM

CROSS-REFERENCE TO RELATED PATENT APPLICATIONS

This application is a continuation of U.S. application Ser. No. 17/221,255, filed Apr. 2, 2021, which is a continuation of U.S. application Ser. No. 17/007,605, filed Aug. 31, 2020, now U.S. Pat. No. 11,001,135 which is a continuation of U.S. application Ser. No. 16/943,295, filed Jul. 30, 2020, now U.S. Pat. No. 11,007,863 which claims the benefit of and priority to U.S. Provisional Patent Application No. 62/881,089, filed Jul. 31, 2019, the entire disclosures of which are incorporated by reference herein.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One embodiment of the present disclosure relates to a refuse vehicle. The refuse vehicle includes multiple tractive elements, a prime mover, and an independent accessory system. The prime mover is configured to generate mechanical energy to drive one or more of the tractive elements. The independent accessory system includes one or more storage tanks configured to store a fuel, and an accessory primary mover. The accessory primary mover is configured to fluidly couple with the one or more storage tanks to receive the fuel from the one or more storage tanks and operate to pressurize a hydraulic fluid to drive an accessory of the refuse vehicle. The accessory primary mover is configured to pressurize the hydraulic fluid to drive the accessory of the refuse vehicle independently of operation of the prime mover.

Another embodiment of the present disclosure relates to an independent accessory system for a refuse vehicle. The system includes one or more storage tanks configured to store a fuel, and an accessory primary mover. The accessory primary mover is configured to fluidly couple with the one or more storage tanks to receive the fuel from the one or more storage tanks and operate to pressurize a hydraulic fluid to drive an accessory of the refuse vehicle. The accessory primary mover is configured to pressurize the hydraulic fluid to drive the accessory of the refuse vehicle independently of operation of a prime mover of the refuse vehicle.

Another embodiment of the present disclosure relates to a refuse vehicle. The refuse vehicle includes an independent compressed natural gas (CNG) system including multiple CNG storage tanks configured to store CNG fuel. The independent compressed natural gas (CNG) also includes an independent CNG engine. The independent CNG engine is configured to receive the CNG fuel from the multiple CNG storage tanks and generate mechanical energy using the CNG fuel. The independent CNG engine operates independently of operation of a primary mover of the refuse vehicle.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
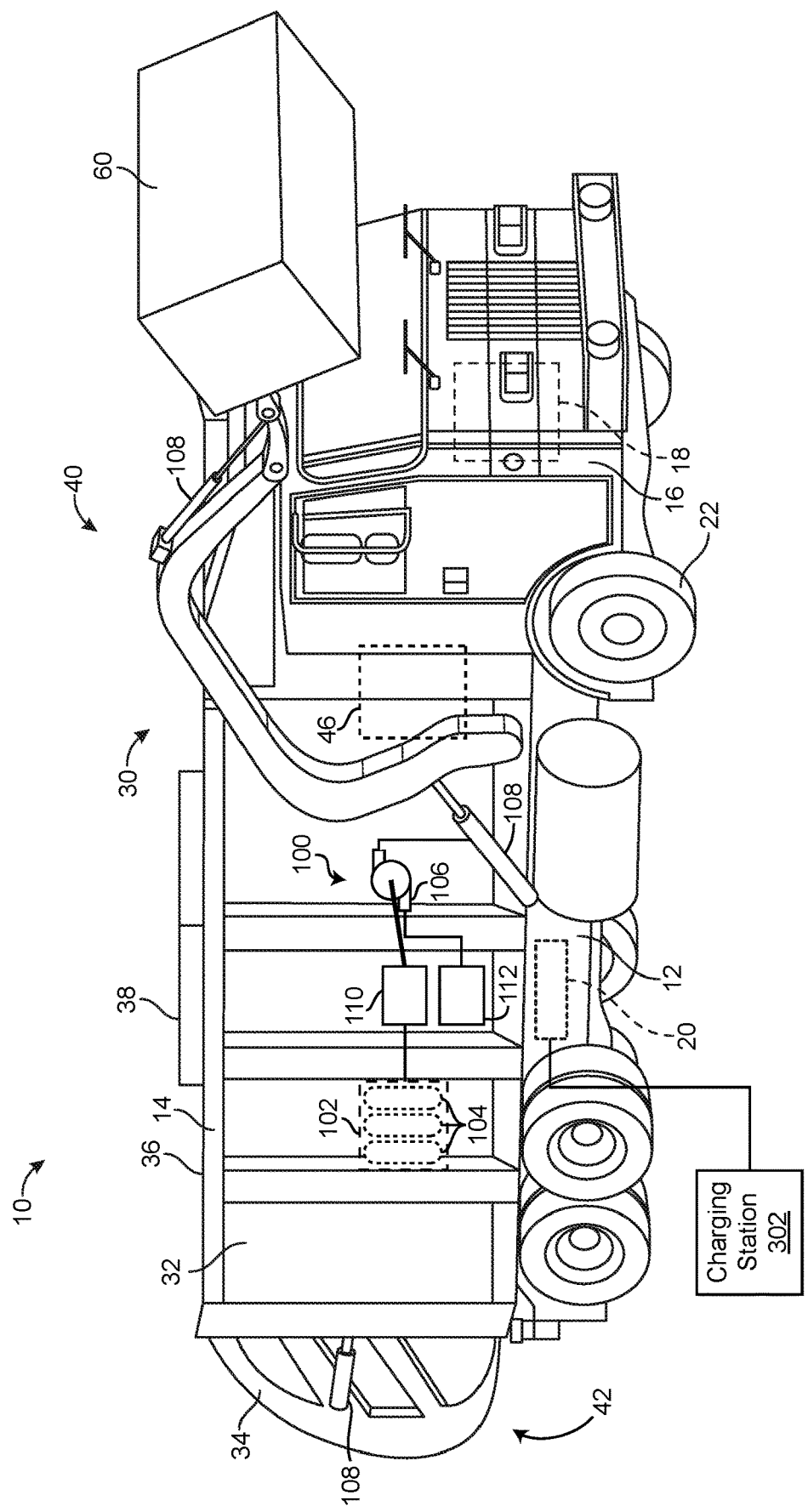
FIG. 1 is a perspective view of a refuse vehicle including an independent accessory system, according to an exemplary embodiment.

Before turning to the FIGURES, which illustrate certain exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, a refuse vehicle includes a prime mover configured to drive the refuse vehicle for transportation. The refuse vehicle may include tractive elements (e.g., wheels) that are configured to be driven by the prime mover to transport the refuse vehicle from location to location. The prime mover can be an electric motor, a compressed natural gas (CNG) engine, an internal combustion engine (e.g., a diesel engine, a gasoline engine, etc.), or any combination thereof. For example, the refuse vehicle may be a hybrid refuse vehicle that includes both an electric motor and an internal combustion engine.

The refuse vehicle also includes an independent accessory system that is configured to operate various body functions of the refuse vehicle. For example, the independent accessory system can be configured to operate lift arms, a packer apparatus, a tailgate, lifting/dumping apparatuses, etc., of the refuse vehicle. The independent accessory system can include one or more fuel tanks (e.g., pressure vessels) that store fuel (e.g., CNG fuel, diesel fuel, gasoline fuel, etc.) for use by an engine (e.g., an internal combustion engine). The fuel may be stored in the one or more fuel tanks as a liquid fuel, a gaseous fuel, or a combination thereof (e.g., a saturated fuel). The engine may be configured to fluidly couple with the fuel tanks to receive fuel from the tanks, combust the fuel, and drive a hydraulic pump. The hydraulic pump can draw or recirculate hydraulic fluid from a reservoir and provide the hydraulic fluid to one or more hydraulic cylinders. The hydraulic cylinders can be operated to perform various body functions (e.g., by extending and/or retracting).

The independent accessory system can be operated by a user through a human machine interface (HMI) and a controller. The controller may receive user inputs from the HMI and generate control signals for the engine and/or the hydraulic pump to perform requested operations of the body functions. The engine and the hydraulic pump may be sized according to requirements of the various body functions. For example, a compaction apparatus that compacts, crushes, compresses, or otherwise packs refuse may require a larger hydraulic cylinder, hydraulic pump, and engine. Likewise, a smaller hydraulic cylinder, hydraulic pump, and engine may be suitable for lift arms for small refuse collection bins.

In some embodiments, one or more of the components of the independent accessory system are positioned within a modular unit (e.g., a modular add-on unit, an accessory power unit, etc.). The modular unit can be removably coupled with the refuse vehicle. The modular unit can include the engine, the hydraulic pump, a reservoir for the hydraulic pump, etc. In some embodiments, the modular unit is configured to fluidly couple with the fuel tanks to receive the fuel from the fuel tanks. The modular unit can be removably and/or fixedly coupled anywhere on the refuse vehicle, and may be fluidly coupled with the fuel tanks.

The prime mover of the refuse vehicle may be an electric motor. If the prime mover is an electric motor, the refuse vehicle may include a battery system having battery cells. The battery cells may store electrical energy (e.g., in the form of chemical energy) and provide the electrical energy to the electric motor for transportation. The battery system can be configured to removably electrically couple with a charging station that may be located at jobsites, along a route of the refuse vehicle, at charging locations, at a fleet management location (e.g., a home base), etc. The charging station can include an engine, a generator, and fuel tanks. The fuel tanks can provide the engine with fuel. The engine combusts the fuel and drives the generator (e.g., through a shaft). The generator then charges the batteries with electrical power/electrical energy that can be used to transport the refuse vehicle.

Overall Vehicle

As shown in FIG. 1, a vehicle, shown as refuse vehicle 10 (e.g., a garbage truck, a waste collection truck, a sanitation truck, a recycling truck, etc.), is configured as a front-loading refuse truck. In other embodiments, the refuse vehicle 10 is configured as a side-loading refuse truck or a rear-loading refuse truck. In still other embodiments, the vehicle is another type of vehicle (e.g., a skid-loader, a telehandler, a plow truck, a boom lift, etc.). As shown in FIG. 1, the refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator (e.g., a seat, a steering wheel, actuator controls, a user interface, switches, buttons, dials, etc.).

As shown in FIG. 1, the refuse vehicle 10 includes an electric motor, a CNG engine, a hybrid engine, an internal combustion engine, a diesel engine, a gasoline engine, etc., shown as prime mover 18, and an energy storage system, shown as battery system 20. In some embodiments, the prime mover is or includes an internal combustion engine. For example, the prime mover may be a diesel engine, a gasoline engine, a CNG engine, etc. According to the exemplary embodiment shown in FIG. 1, the prime mover 18 is coupled to the frame 12 at a position beneath the cab 16. The prime mover 18 is configured to provide power to a plurality of tractive elements, shown as wheels 22 (e.g., via a drive shaft, axles, etc.). In other embodiments, the prime mover 18 is otherwise positioned and/or the refuse vehicle 10 includes a plurality of electric motors to facilitate independently driving one or more of the wheels 22. In still other embodiments, the prime mover 18 or a secondary electric motor is coupled to and configured to drive a hydraulic system that powers hydraulic actuators. According to the exemplary embodiment shown in FIG. 1, the battery system 20 is coupled to the frame 12 beneath the body 14. In other embodiments, the battery system 20 is otherwise positioned (e.g., within a tailgate of the refuse vehicle 10, beneath the cab 16, along the top of the body 14, within the body 14, etc.).

According to an exemplary embodiment, the battery system 20 is configured to provide electric power to (i) the prime mover 18 to drive the wheels 22, (ii) electric actuators of the refuse vehicle 10 to facilitate operation thereof (e.g., lift actuators, tailgate actuators, packer actuators, grabber actuators, etc.), and/or (iii) other electrically operated accessories of the refuse vehicle 10 (e.g., displays, lights, etc.). In some embodiments, the refuse vehicle 10 includes an internal combustion generator that utilizes one or more fuels (e.g., gasoline, diesel, propane, natural gas, hydrogen, etc.) to generate electricity to charge the battery system 20, power the prime mover 18, power the electric actuators, and/or power the other electrically operated accessories (e.g., a hybrid refuse vehicle, etc.). For example, the refuse vehicle 10 may have an internal combustion engine augmented by the prime mover 18 to cooperatively provide power to the wheels 22. The battery system 20 may thereby be charged via an on-board generator (e.g., an internal combustion generator, a solar panel system, etc.), from an external power source (e.g., overhead power lines, mains power source through a charging input, etc.), and/or via a power regenerative braking system, and provide power to the electrically operated systems of the refuse vehicle 10.

According to an exemplary embodiment, the refuse vehicle 10 is configured to transport refuse from various waste receptacles within a municipality to a storage and/or processing facility (e.g., a landfill, an incineration facility, a recycling facility, etc.). As shown in FIG. 1, the body 14 includes a plurality of panels, shown as panels 32, a tailgate 34, and a cover 36. The panels 32, the tailgate 34, and the cover 36 define a collection chamber (e.g., hopper, etc.), shown as refuse compartment 30. Loose refuse may be placed into the refuse compartment 30 where it may thereafter be compacted (e.g., by a packer system, etc.). The refuse compartment 30 may provide temporary storage for refuse during transport to a waste disposal site and/or a recycling facility. In some embodiments, at least a portion of the body 14 and the refuse compartment 30 extend above or in front of the cab 16. According to the embodiment shown in FIG. 1, the body 14 and the refuse compartment 30 are positioned behind the cab 16. In some embodiments, the refuse compartment 30 includes a hopper volume and a storage volume. Refuse may be initially loaded into the hopper volume and thereafter compacted into the storage volume by a compacting apparatus 46. According to an exemplary embodiment, the hopper volume is positioned between the storage volume and the cab 16 (e.g., refuse is loaded into a position of the refuse compartment 30 behind the cab 16 and stored in a position further toward the rear of the refuse compartment 30, a front-loading refuse vehicle, a side-loading refuse vehicle, etc.). In other embodiments, the storage volume is positioned between the hopper volume and the cab 16 (e.g., a rear-loading refuse vehicle, etc.).

As shown in FIG. 1, the refuse vehicle 10 includes a lift mechanism/system (e.g., a front-loading lift assembly, etc.), shown as lift assembly 40, coupled to the front end of the body 14. In other embodiments, the lift assembly 40 extends rearward of the body 14 (e.g., a rear-loading refuse vehicle, etc.). In still other embodiments, the lift assembly 40 extends from a side of the body 14 (e.g., a side-loading refuse vehicle, etc.). As shown in FIG. 1, the lift assembly 40 is configured to engage a container (e.g., a residential trash receptacle, a commercial trash receptacle, a container having a robotic grabber arm, etc.), shown as refuse container 60. The lift assembly 40 may include various actuators (e.g., electric actuators, hydraulic actuators, pneumatic actuators, etc.), shown as hydraulic cylinders 108, to facilitate engaging the refuse container 60, lifting the refuse container 60, and tipping refuse out of the refuse container 60 into the hopper volume of the refuse compartment 30 through an opening in the cover 36 or through the tailgate 34. The lift assembly 40 may thereafter return the empty refuse container 60 to the ground. According to an exemplary embodiment, a door, shown as top door 38, is movably coupled along the cover 36 to seal the opening thereby preventing refuse from escaping the refuse compartment 30 (e.g., due to wind, bumps in the road, etc.).

Accessory Power System

Referring still to FIG. 1, the refuse vehicle 10 also includes an independent accessory system 100 (e.g., a CNG powered accessory system, a diesel powered accessory system, etc.), according to an exemplary embodiment. The independent accessory system 100 can be configured to drive, move, provide mechanical energy for, etc., or otherwise operate various body functions of refuse vehicle 10 independently of an operation of prime mover 18. For example, the independent accessory system 100 can be configured to drive or operate the lift assembly 40, a tailgate lift assembly 42, etc., or any other body function, lift apparatus, auxiliary apparatus, etc., of the refuse vehicle 10. In some embodiments, the independent accessory system 100 is configured to operate a hydraulic cylinder 108 of any of the lift apparatuses, auxiliary apparatuses, etc. The independent accessory system 100 may be configured to operate independently of the prime mover (e.g., prime mover 18) of the refuse vehicle 10. In some embodiments, the independent accessory system 100 can operate to drive the hydraulic cylinders 108 without requiring operation of the prime mover 18. For example, the independent accessory system 100 can independently provide mechanical energy for the various body functions 114 of the refuse vehicle 10, without requiring operation of or mechanical energy from the prime mover 18 (e.g., even if prime mover 18 is shut-off or inoperational, or in an idle mode). In some embodiments, the independent accessory system 100 and operation of the prime mover 18 are linked (e.g., linked in a control scheme). However, if operation of the independent accessory system 100 and the prime mover 18 are linked in a control scheme, the independent accessory system 100 and the prime mover 18 (e.g., the prime mover of the refuse vehicle 10) may still be able to provide mechanical energy for their respective functions (e.g., operation of the body functions 114 and transportation of the refuse vehicle 10, respectively) independent of the operation of each other.

The body functions can include operation of lift arms (e.g., front loading lift arms, side loading lift arms, rear loading lift arms), tailgates, dumping operations, packing operations, etc., of the refuse vehicle 10. The refuse vehicle 10 can include various hydraulic cylinders 108 configured to perform any of the body functions described herein. For example, the refuse vehicle 10 can include the compacting apparatus 46 that is configured to pack, crush, compact, compress, etc., refuse that is loaded into the hopper or the body 14 using the hydraulic cylinders 108. The independent accessory system 100 can be configured to operate any of the hydraulic cylinders 108 to perform the various body functions in response to user inputs. The independent accessory system 100 can be configured to perform the various body functions independently of each other, or in conjunction with each other.

Figure 2:
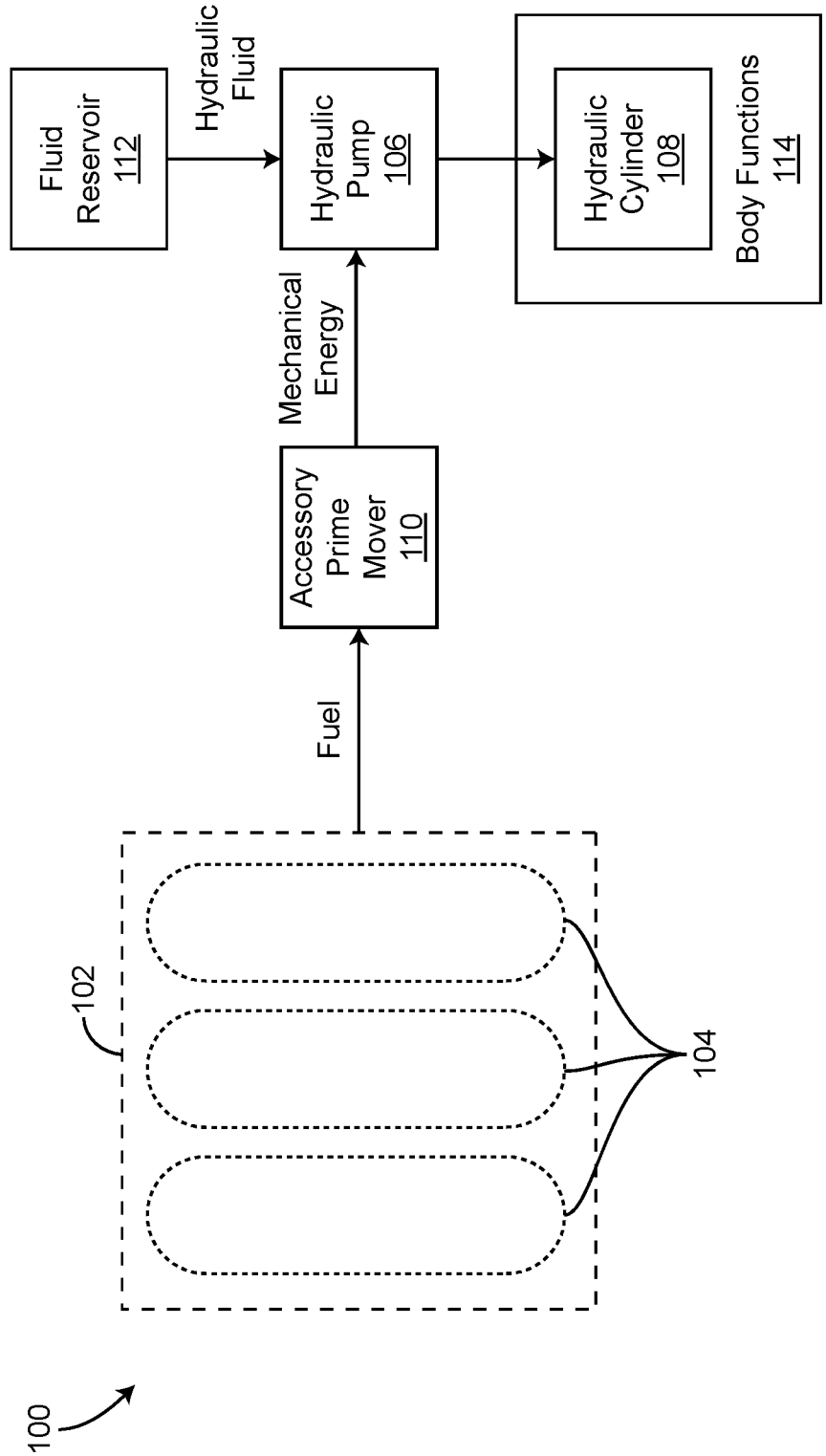
FIG. 2 is a block diagram of the independent accessory system of the refuse vehicle of FIG. 1, according to an exemplary embodiment.
Figure 5:
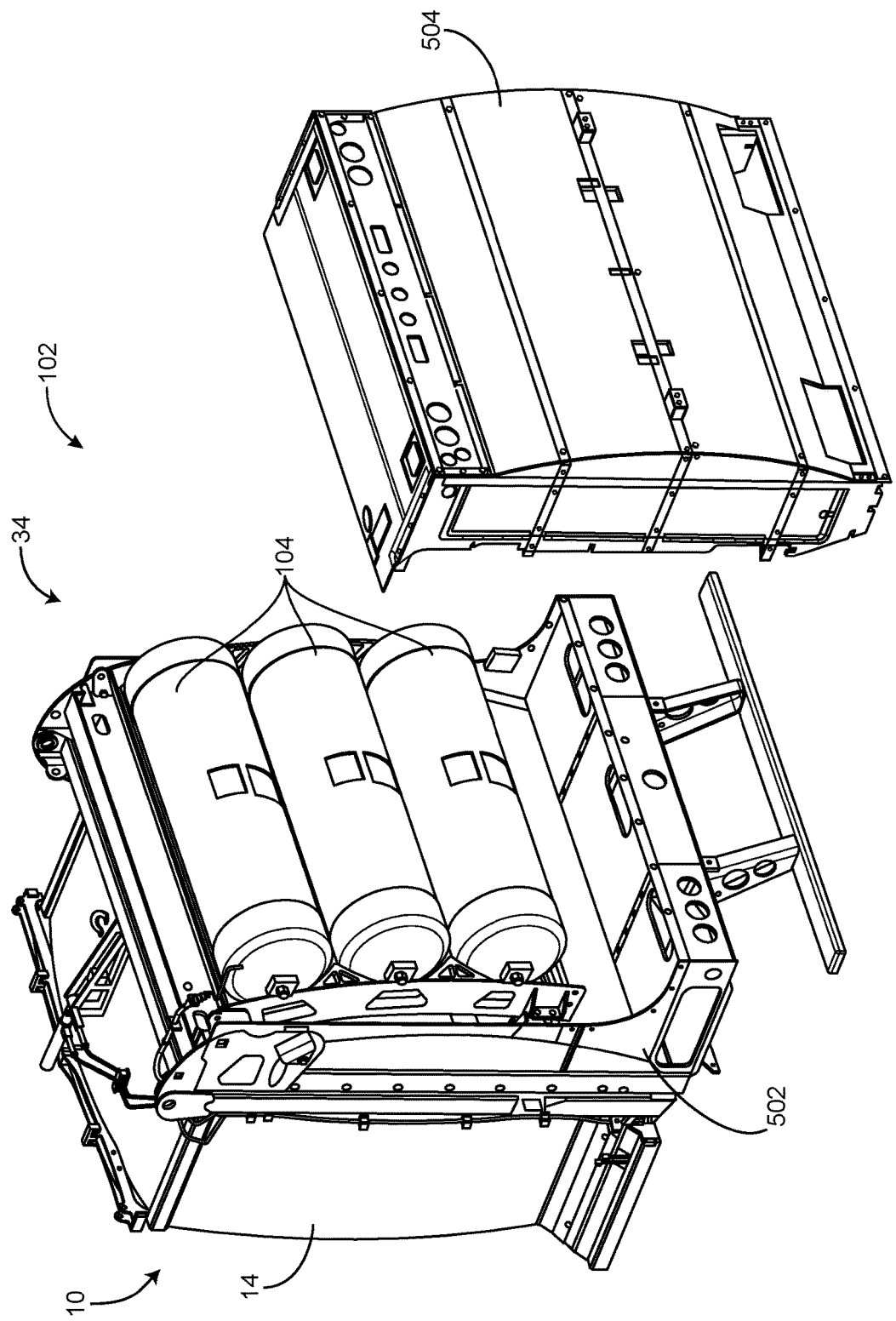
FIG. 5 is a perspective view of a support structure for fuel tanks of the independent accessory system of the refuse vehicle of FIG. 1, according to an exemplary embodiment.

Referring to FIGS. 1 and 2, the independent accessory system 100 includes one or more tanks, capsules, containers, pressure vessels, cartridges, etc., shown as fuel tanks 104 (e.g., CNG tanks, diesel fuel tanks, gasoline tanks, etc.). The fuel tanks 104 are supported, fixedly coupled, fixed, connected, etc., or otherwise coupled with a support unit, a mount unit, a structure, etc., shown as support structure 102 of the refuse vehicle 10. In some embodiments, the fuel tanks 104 are positioned within the tailgate 34 (e.g., as shown in FIG. 5, described in greater detail below). For example, the fuel tanks 104 and the support structure 102 can be disposed within an inner volume of the tailgate 34.

The independent accessory system 100 also includes an internal combustion engine, a CNG engine, a diesel engine, a fuel cell, a hydrogen engine, an electric motor, etc., shown as accessory prime mover 110. The accessory prime mover 110 is configured to receive fuel (e.g., diesel fuel, gasoline, CNG, hydrogen, electrical energy, a resource, etc.) from the fuel tanks 104 through a piping system, a plumbing system, one or more pipes, etc. The piping system can include various tubular members, pipes, hoses, valves, connectors, etc., that fluidly couple with the tank 112 and the accessory prime mover 110 such that fuel can be provided from the tank 112 to the accessory prime mover 110. The accessory prime mover 110 can use the fuel (e.g., combust the fuel) to produce mechanical energy. The mechanical energy is output by the accessory prime mover 110 to a pump 106. The pump 106 can be driven by the accessory prime mover 110 and draw hydraulic fluid from a fluid reservoir, a tank, etc., shown as tank 112. The tank 112 is coupled with (e.g., fixedly coupled, attached, mounted, etc.) with the refuse vehicle 10. The tank 112 can be fixedly coupled with the body 14. The pump 106 outputs the hydraulic fluid to the hydraulic cylinders 108 to operate the hydraulic cylinders 108 to perform the body functions 114.

In some embodiments, the accessory prime mover 110 is a smaller engine than the prime mover 18. The accessory prime mover 110 and the hydraulic pump 106 can be sized according to requirements of the various body functions. Other refuse vehicles use the prime mover 18 to drive the body functions. However, this may be inefficient, since the prime mover 18 is sized to transport the refuse vehicle 10 (e.g., to provide torque to the wheels 22) and may be oversized for the body functions. Using a smaller engine (e.g., the accessory prime mover 110) with a correspondingly sized hydraulic pump 106 facilitates a more efficient and robust refuse vehicle, which does not use an oversized prime mover 18 for body functions.

Advantageously, the independent accessory system 100 can use pre-existing infrastructure of the refuse vehicle 10. For example, CNG-powered refuse vehicles (e.g., refuse vehicles that use a CNG engine as the prime mover for transportation purposes) may already include a support structure and fuel tanks that can be used by the accessory prime mover 110/hydraulic pump 106 for the body functions.

Accessory Power Unit

Figure 6:
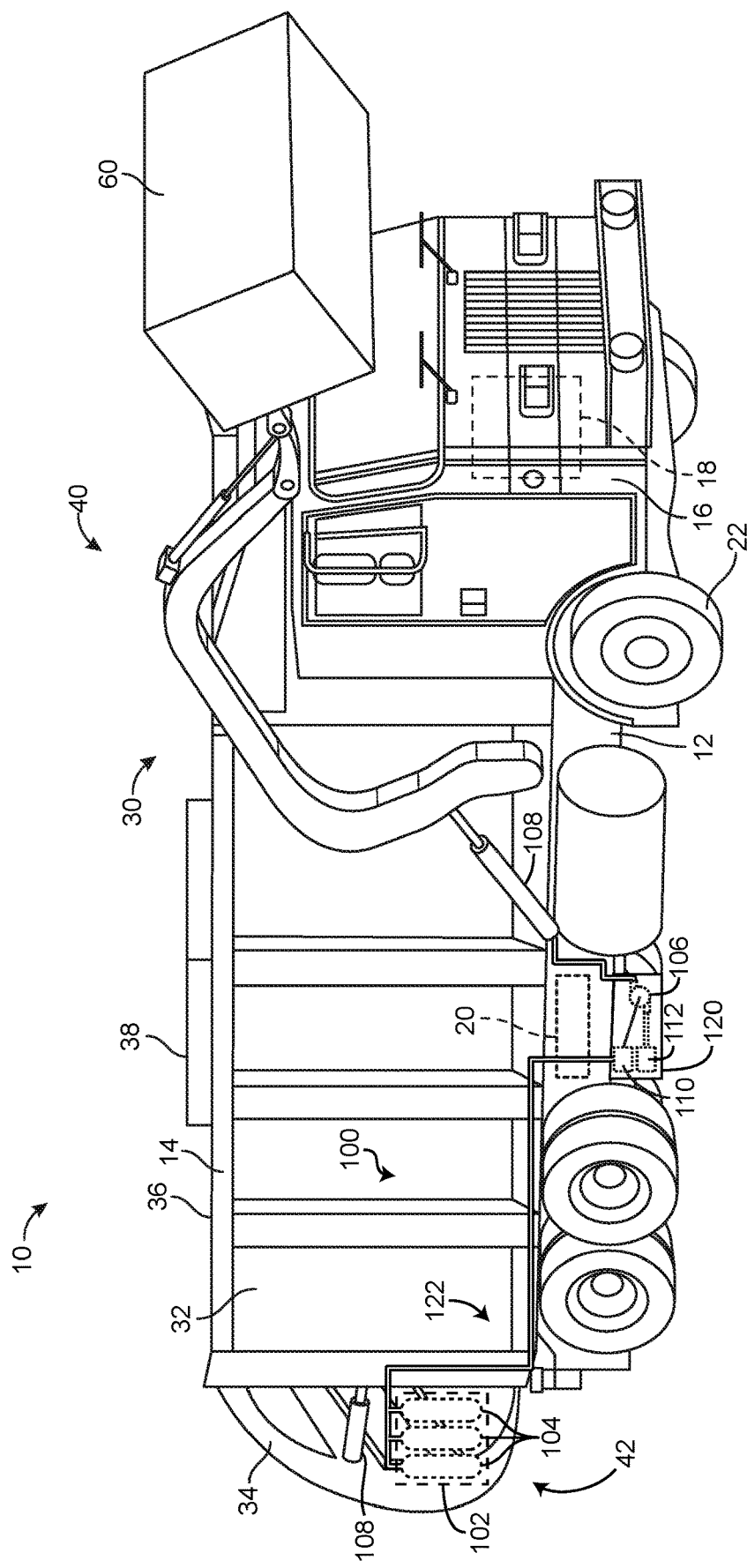
FIG. 6 is a perspective view of the refuse vehicle of FIG. 1, with an accessory power unit that contains some of the components of the independent accessory system of FIG. 1, according to an exemplary embodiment.

Referring particularly to FIG. 6, one or more portions of the independent accessory system 100 can be contained in, enclosed in, supported by, etc., a modular unit, an add-on unit, a removable unit, etc., shown as accessory power unit (APU) 120. The APU 120 can be configured to integrate with existing infrastructure (e.g., CNG infrastructure) of the refuse vehicle 10 to operate or drive the various body functions of the refuse vehicle 10. The refuse vehicle 10 can be configured as a front loading refuse vehicle, a side loading refuse vehicle, a rear loading refuse vehicle, etc. It should be understood that while the inventive concepts described herein reference a refuse vehicle, it is contemplated that the APU 120 and/or the various components of the independent accessory system 100 are also applicable to various other types of vehicles that include body functions. For example, the independent accessory system 100 and/or the APU 120 can be used on a fire truck, a commercial truck, a heavy-duty truck, etc., or any vehicle that has body functions to be operated independently of the transportation of the vehicle.

The APU 120 can be removably coupled with the refuse vehicle 10 on an underside of the body 14. For example, the APU 120 can be fixedly and removably coupled with the frame 12 beneath the body 14. The APU 120 can be fixedly and removably coupled at a front of the frame 12, at a rear end of the frame 12, centrally along the frame 12, etc. In other embodiments, the APU 120 can be fixedly and removably coupled with a side of the body 14, within the body 14, within a compartment of the body 14, on top of the body 14, etc. The APU 120 can be positioned anywhere about the body 14 or anywhere on the refuse vehicle 10 that provides sufficient structural strength (e.g., along the frame 12, near a chassis of the refuse vehicle 10, etc.).

The APU 120 includes the accessory prime mover 110, the tank 112, and the hydraulic pump 106, according to an exemplary embodiment. The APU 120 can be a hollow container that protects the various internal components (e.g., the accessory prime mover 110, the tank 112, the hydraulic pump 106, etc.) and removably couples with the refuse vehicle 10. The accessory prime mover 110 of the APU 120 fluidly couples with the fuel tanks 104 through a plumbing system, a piping system, etc., shown as tubular system 122. The tubular system 122 includes various tubular members that fluidly couple the fuel tanks 104 with the accessory prime mover 110. The accessory prime mover 110 receives the fuel from the fuel tanks 104 through the tubular system 122, combusts the fuel, and drives the hydraulic pump 106. The hydraulic pump 106 then drives the hydraulic cylinder(s) 108 of the various body functions of the refuse vehicle 10 (e.g., through various tubular members, pipes, etc.).

Advantageously, the APU 120 facilitates a versatile refuse vehicle with improved efficiency since the accessory prime mover 110 and the hydraulic pump 106 are sized to serve or drive the various hydraulic cylinders 108. The APU 120 can be installed by a technician, plumbed (e.g., by fluidly coupling the accessory prime mover 110 with the fuel tanks 104 through installation of the tubular system 122), and used to operate the various body functions of the refuse vehicle 10. Advantageously, the various body functions of the refuse vehicle 10 can be operated independently of the prime mover 18. The APU 120 can integrate with existing structure (e.g., existing fuel tanks 104), to thereby convert refuse vehicles to the refuse vehicle 10 described herein.

Control System

Figure 3:
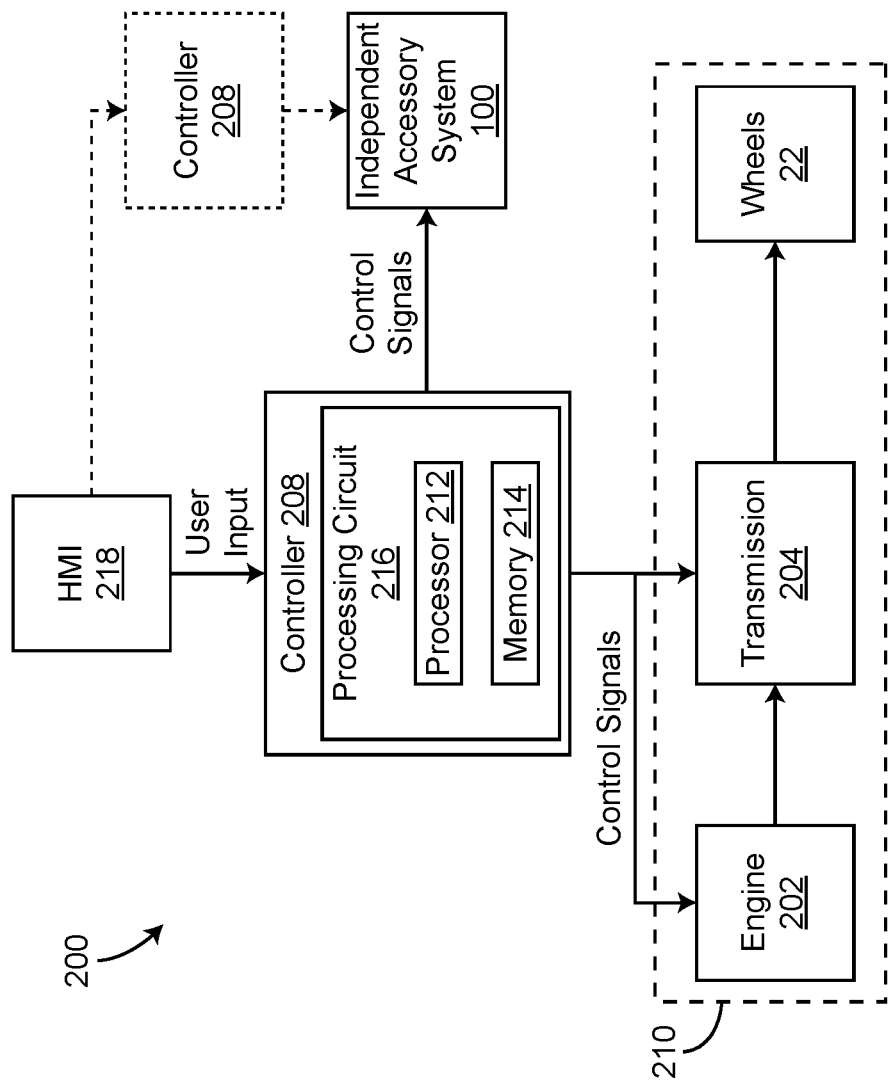
FIG. 3 is a block diagram of a control system of the refuse vehicle of FIG. 1, according to an exemplary embodiment.

Referring particularly to FIG. 3, a control system 200 can be configured to operate the refuse vehicle 10, according to an exemplary embodiment. The control system 200 includes a controller that is configured to generate control signals for a drivetrain, a chassis, etc., of the refuse vehicle 10, shown as drivetrain 210. The drivetrain 210 includes an engine 202, a transmission 204, and wheels 22 of the refuse vehicle 10. The engine 202 may be the prime mover 18 of the refuse vehicle 10. The engine 202 can produce mechanical energy and output the mechanical energy to the transmission 204. The transmission 204 receives the mechanical energy from the engine 202 and outputs mechanical energy (e.g., rotational kinetic energy) to the wheels 22 (e.g., at a higher torque than the mechanical energy input by the engine 202).

Control system 200 includes a controller 208 that is configured to generate control signals for the engine 202 and the transmission 204. The controller 208 can include a circuit, shown as processing circuit 216, a processor, shown as processor 212, and memory, shown as memory 214, according to an exemplary embodiment. Controller 208 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. The processing circuit 216 of controller 208 may include an ASIC, one or more FPGAs, a DSP, circuits containing one or more processing components, circuitry for supporting a microprocessor, a group of processing components, or other suitable electronic processing components (i.e., processor 212). In some embodiments, the processing circuit 216 is configured to execute computer code stored in memory 214 to facilitate the activities described herein.

Memory 214 may be any volatile or non-volatile computer-readable storage medium capable of storing data or computer code relating to the activities described herein. According to an exemplary embodiment, memory 214 includes computer code modules (e.g., executable code, object code, source code, script code, machine code, etc.) configured for execution by the processing circuit 216.

In some embodiments, a single controller 208 is configured to generate control signals for both the drivetrain 210 and the independent accessory system 100. In other embodiments, multiple controllers 208 are configured to generate control signals for independent accessory system 100 and drivetrain 210 independently of each other. For example, a first controller 208 can be configured to provide control signals to engine 202 and/or transmission 204 of drivetrain 210, while a second controller 208 can be configured to provide control signals for independent accessory system 100. The first and second controllers 208 can be configured to receive user inputs from a human machine interface (HMI) or a user interface, shown as HMI 218. In some embodiments, the first and second controllers 208 are configured to receive user inputs from separate HMIs 218. The HMIs 218 can be positioned within the cab 16 or near the associated body functions (e.g., near lift assembly 40). For example, the HMI 218 that controls the operation of the drivetrain 210 can be disposed within the cab 16, while the HMI 218 that controls the operation of the lift assembly 40 can be positioned on the body 14 near the lift assembly 40.

Charging System

Figure 4:
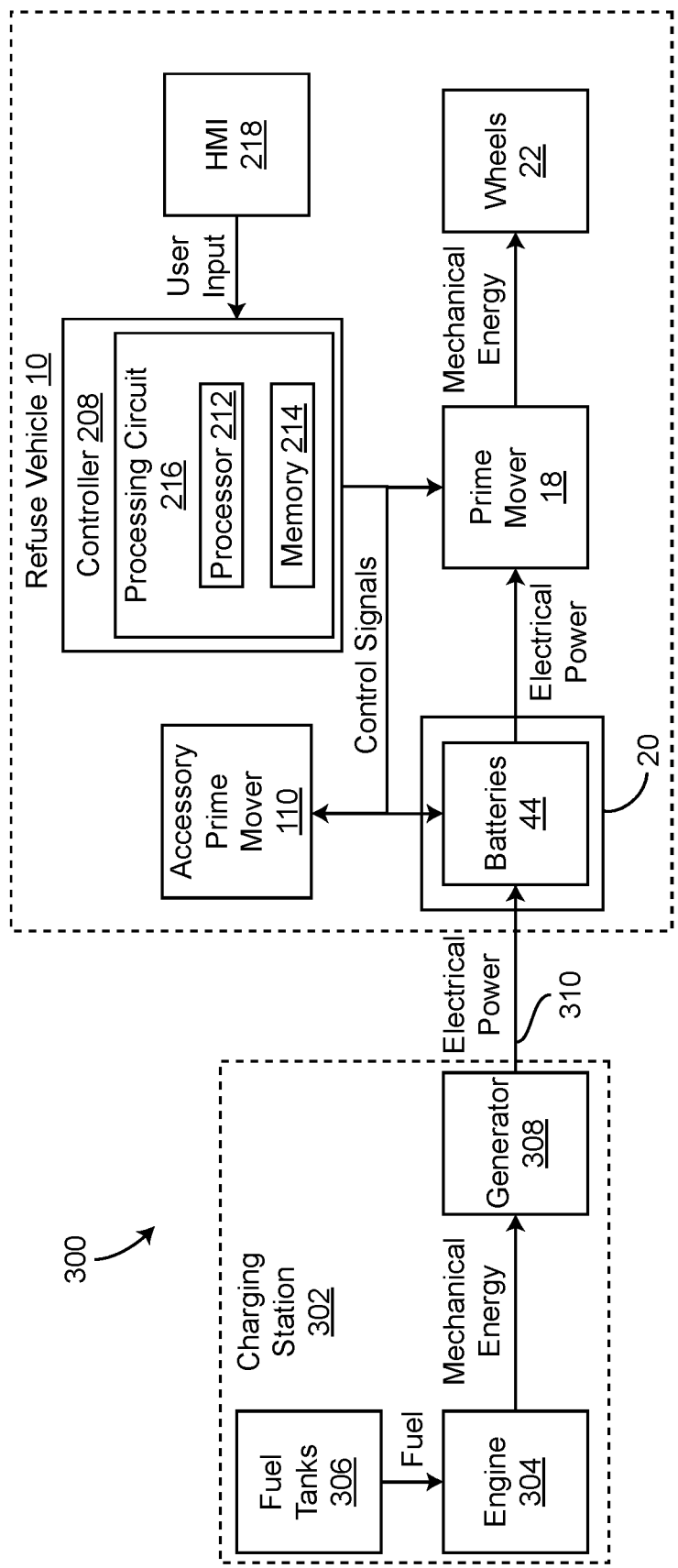
FIG. 4 is a block diagram of a charging system for the refuse vehicle of FIG. 1, according to an exemplary embodiment.

Referring particularly to FIG. 4, a charging system 300 can be used to re-charge batteries 44 of the battery system 20, according to an exemplary embodiment. The charging system 300 includes a charging station 302 that can be positioned at a fleet management site, at a job site, along the refuse vehicle's route, etc. The charging station 302 includes one or more fuel tanks 306, an engine 304, and a generator 308. The fuel tanks 306 can be the same as or similar to the fuel tanks 104 on the refuse vehicle 10. Likewise, the engine 304 can be similar to the accessory prime mover 110 on the refuse vehicle 10.

The refuse vehicle 10 includes controller 208 that is configured to generate and provide control signals for prime mover 18 (e.g., an electric motor) and/or accessory prime mover 110. The controller 208 can be configured to receive user inputs from HMI 218 and generate the control signals for the prime mover 18 and/or the accessory prime mover 110 based on the user inputs. In some embodiments, the controller 208 generates control signals to operate the prime mover 18 and/or the accessory prime mover 110 to perform operations requested by the user through HMI 218.

The refuse vehicle 10 can be driven by an electric motor, an engine (e.g., engine 202), or a hybrid engine-electric motor. In this way, the refuse vehicle may be an electrically driven refuse vehicle, an internal-combustion engine driven vehicle, or a hybrid vehicle. For example, the refuse vehicle 10 can include a plurality of prime movers. One or more of the prime movers can be electric motors (e.g., the prime mover 18) and/or internal combustion engines (e.g., the engine 202). The electric motors used to transport the refuse vehicle 10 are supplied with power by batteries 44 of the battery system 20.

The batteries 44 can be removable and/or replaceable battery cells. For example, the batteries 44 can be charged at a fleet management site in a charging rack, then installed into the refuse vehicle 10. The batteries 44 can be later removed (e.g., after a state of charge of the batteries 44 has been depleted) and replaced with new or fresh batteries (e.g., that may be stored on the refuse vehicle 10).

The operator of the refuse vehicle 10 may arrive at a job site, or at a fleet management location and electrically couple the charging station 302 with the batteries 44. Since some refuse vehicles operate using CNG, the charging station 302 may use pre-existing fuel tanks 306 at the fleet management location that store CNG. In some embodiments, the engine 304 and the generator 308 are packaged in a unit that is configured to fluidly couple with the fuel tanks 306. In some embodiments, the fuel tanks 306 are removably fluidly coupled with the engine 304. In this way, the fuel tanks 306 can be used for replenishing the fuel tanks 104 on the refuse vehicle 10 and/or for charging batteries 44 of the refuse vehicle 10. The generator 308 can be any mechanical transducer capable of receiving mechanical energy (e.g., rotational kinetic energy) and generating electrical energy for the batteries 44. For example, the generator 308 can include a stator and an armature that is driven by the engine 304 to produce electrical current or electrical energy.

Referring again to FIG. 2, the accessory prime mover 110 can be configured to output mechanical energy to generator 116 to drive generator 116 to generate electrical power. The electrical power is provided to batteries 44 of refuse vehicle 10 to charge the batteries 44. In this way, accessory prime mover 110 can operate independently to drive generator 116 to charge batteries 44 of refuse vehicle 10.

Support Infrastructure

Referring now to FIG. 5, one possible infrastructure of the support structure 102 includes the fuel tanks 104 stored within the tailgate 34. The tailgate 34 can include a first or inner member 502 and a second or outer member 504. The first member 502 is configured to fixedly and/or pivotally couple with the refuse vehicle 10. The first member 502 and the second member 504 can be configured to removably and fixedly couple with each other to define an inner volume. The fuel tanks 104 can be fixedly coupled with the first member 502 and stored within the inner volume defined by the first member 502 and the second member 504. The fuel tanks 104 can be oriented horizontally (as shown in FIG. 5) or vertically. The fuel tanks 104 can be fixedly coupled with the first member 502 at their ends (e.g., with fasteners). In some embodiments, the fuel tanks 104 extend along substantially an entire width of the tailgate 34.

It should be understood that while several configurations of the support structure 102 are described herein, the inventive concepts are not limited to these configurations of the support structure 102. The fuel tanks 104 can be positioned anywhere on the refuse vehicle 10, or in multiple locations. For example, the fuel tanks 104 can be positioned on top of the refuse vehicle 10 (e.g., on top of the body 14), underneath the refuse vehicle 10 (e.g., on an underside of the body 14, on the frame 12 beneath the refuse vehicle 10, etc.), between the cab 16 and the body 14, etc.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse vehicle comprising:
a prime mover configured to generate mechanical energy for the refuse vehicle; and
an independent accessory system, comprising:
one or more storage tanks configured to store a fuel;
an accessory primary mover configured to receive the fuel from the one or more storage tanks and operate to pressurize a hydraulic fluid to drive an accessory of the refuse vehicle;
wherein the accessory primary mover is configured to pressurize the hydraulic fluid to drive the accessory of the refuse vehicle independently of operation of the prime mover.

2. The refuse vehicle of claim 1, wherein the prime mover is at least one of an internal combustion engine, a compressed natural gas engine, or an electric motor.

3. The refuse vehicle of claim 2, further comprising:
a battery system comprising a plurality of battery cells configured to store energy, wherein the electric motor is configured to draw electrical power from the plurality of battery cells to drive one or more of a plurality of tractive elements.

4. The refuse vehicle of claim 3, wherein the accessory primary mover is configured to drive a generator to charge the plurality of battery cells.

5. The refuse vehicle of claim 4, wherein the plurality of battery cells are driven to charge by the generator, the generator being driven by another accessory primary mover separate from the accessory primary mover used to pressurize the hydraulic fluid.

6. The refuse vehicle of claim 5, wherein the generator, the other accessory primary mover, and a plurality of charging fuel tanks are stored at a charging station, wherein the refuse vehicle is configured to removably electrically couple with the generator of the charging station to charge the plurality of battery cells of the refuse vehicle.

7. The refuse vehicle of claim 1, wherein the independent accessory system is a compressed natural gas (CNG) system, wherein the fuel is a compressed natural gas, and the accessory primary mover is a CNG engine configured to consume the compressed natural gas to drive a hydraulic pump.

8. The refuse vehicle of claim 1, wherein the independent accessory system is a diesel system, wherein the fuel is a diesel fuel, and the accessory primary mover is an internal combustion engine configured to consume the diesel fuel to drive a hydraulic pump.

9. The refuse vehicle of claim 1, wherein the accessory primary mover and a hydraulic pump that is driven by the accessory primary mover to pressurize the hydraulic fluid are positioned in a modular unit, wherein the modular unit is removably coupled with the refuse vehicle.

10. The refuse vehicle of claim 9, wherein the modular unit is a tailgate that is coupled with the refuse vehicle.

11. An independent accessory system for a refuse vehicle, the independent accessory system comprising:
one or more storage tanks configured to store a fuel; and
an accessory primary mover configured to receive the fuel from the one or more storage tanks and operate to drive an accessory of the refuse vehicle;
wherein the accessory primary mover is configured to drive the accessory of the refuse vehicle independently of operation of a prime mover of the refuse vehicle.

12. The independent accessory system of claim 11, wherein the prime mover of the refuse vehicle is at least one of an internal combustion engine, a compressed natural gas engine, or an electric motor.

13. The independent accessory system of claim 11, wherein the accessory primary mover is configured to drive a generator to generate electrical energy to charge battery cells of the refuse vehicle.

14. The independent accessory system of claim 11, wherein the independent accessory system is a compressed natural gas (CNG) system, wherein the fuel is a compressed natural gas, and the accessory primary mover is a CNG engine configured to consume the compressed natural gas to drive a hydraulic pump.

15. The independent accessory system of claim 11, wherein the independent accessory system is a diesel system, wherein the fuel is a diesel fuel and the accessory primary mover is an internal combustion engine configured to consume the diesel fuel to drive a hydraulic pump.

16. The independent accessory system of claim 11, wherein the accessory primary mover and a hydraulic pump that is driven by the accessory primary mover to pressurize a hydraulic fluid are positioned in a modular unit, wherein the modular unit is removably coupled with the refuse vehicle.

17. The independent accessory system of claim 16, wherein the modular unit is a tailgate of the refuse vehicle.

18. A refuse vehicle comprising:
an independent compressed natural gas (CNG) system comprising:
a CNG storage tank configured to store CNG fuel; and
an independent CNG engine configured to receive the CNG fuel from the CNG storage tank and generate mechanical energy using the CNG fuel, wherein the independent CNG engine operates independently of operation of a primary mover of the refuse vehicle.

19. The refuse vehicle of claim 18, wherein the independent CNG engine is configured to drive operation of one or more accessories of the refuse vehicle.

20. The refuse vehicle of claim 18, wherein the independent CNG engine is configured to drive a generator to charge a battery of the refuse vehicle.

\* \* \* \* \*